Sept. 17, 1957 F. FOERSTER 2,806,992
MEASURING AND TESTING INSTRUMENTS
Filed Nov. 15, 1952 4 Sheets-Sheet 1

Inventor
Friedrich Foerster

Sept. 17, 1957 F. FOERSTER 2,806,992
MEASURING AND TESTING INSTRUMENTS
Filed Nov. 15, 1952 4 Sheets-Sheet 2

Inventor
Friedrich Foerster

United States Patent Office 2,806,992
Patented Sept. 17, 1957

2,806,992
MEASURING AND TESTING INSTRUMENTS
Friedrich Foerster, Reutlingen, Germany
Application November 15, 1952, Serial No. 320,739
4 Claims. (Cl. 324—34)

This invention relates to methods and apparatus for testing and more particularly to methods and apparatus for testing in which a change in one characteristic of a structure under test may be indicated independently and irrespective of changes in other and different characteristics.

It is known that changes in the physical character of a structure may change the electrical loading effect on an alternating current excited coil placed in proximity to the structure. Instruments have heretofore been provided for testing for changes in electrical load, that is, changes in effective resistance of a coil, to detect changes in the physical character of a structure. Such instruments have not been entirely successful, however, because the actual effect of a change in character of the structure on the electrical characteristics of the coil has not been realized or considered. In many cases, the instruments have given indication of a change in one characteristic of the structure under test when that characteristic had not changed at all and the indication was actually due to a change in an entirely different characteristic from that tested for.

According to this invention, a change in only one characteristic is tested for and indicated irrespective of and independently from changes in other and different characteristics. This is accomplished through an alternating current excited test coil loaded by the structure under test with means for detecting changes in only a certain characteristic of the structure from the electrical effect on the coil.

Through testing of the effect on inductive reactance and resistance of a coil as produced by various changes in the physical character of an article and in the physical relation of the coil to the article, it has been discovered that the relative effect upon inductive reactance and resistance is different for changes in different characteristics and that for a change in only one characteristic of the structure, the change in inductive reactance of the coil will be a certain function of the associated change in effective resistance.

According to a particular feature of this invention, an alternating current excited test coil is placed in proximity to a structure to be tested, the coil having an inductive reactance varying according to a certain function of the resistance with changes in a certain characteristic of the structure under test and means are provided for producing a particular indication when and only when the inductive reactance varies with the resistance according to that particular function.

In a preferred application of the invention, an oscilloscope having a screen and an electron beam directed at a spot on the screen is used as an indicator. A phase sensitive detector arrangement is provided between the alternating current excited test coil and the oscilloscope and is utilized to deflect the spot in one direction with a change in one characteristic of the structure under test and in another and different direction with a change in another characteristic of the structure under test.

In another preferred application of the invention, an oscilloscope is again used as an indicating means with an alternating electrical signal derived from the test coil being applied to one of the deflection means of the oscilloscope and with a reference alternating electrical signal applied to the other deflection means of the oscilloscope so as to produce a pattern on the screen of the oscilloscope. With changes in one characteristic of the structure under test, the pattern on the screen will change in only one particular manner while with changes in a different characteristic, the pattern will change in another and different manner.

In still another preferred embodiment of the invention, a capacitor is connected in series with the test coil and forms with the test coil a resonant circuit and means are provided for measuring and indicating the voltage developed across the test coil. It has been discovered that if the resonant frequency of the circuit is greater than the frequency of the alternating current applied to the coil, a change in one characteristic of the structure under test will change the magnitude of the voltage across the coil while a change in another and different characteristic of the structure under test will have no effect on the magnitude of the voltage across the coil. With this arrangement, accordingly, a change in the one characteristic of the structure under test may be indicated separately and independently from a change in the other characteristic. With the resonant frequency of the circuit less than the frequency of the alternating current applied to the coil, the reverse effect takes place.

It is an object of this invention, accordingly, to provide improved methods and apparatus for electrically testing for changes in particular physical characteristics of structures.

A more specific object of this invention is to provide improved methods and means for testing for changes in the physical character of structures by which a change in one physical characteristic may be indicated and measured independently and irrespective of changes in other and different physical characteristics.

This invention contemplates other objects, features and advantages which will become more fully apparent from the following detailed description taken in conjunction with the accompanying drawings which illustrate preferred embodiments and in which.

Figure 1:
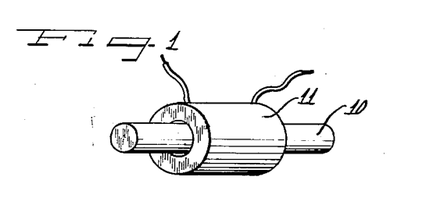
Figure 1 is a perspective view of one test coil arrangement in which a cylindrical article under test is placed inside the test coil.
Figure 2:
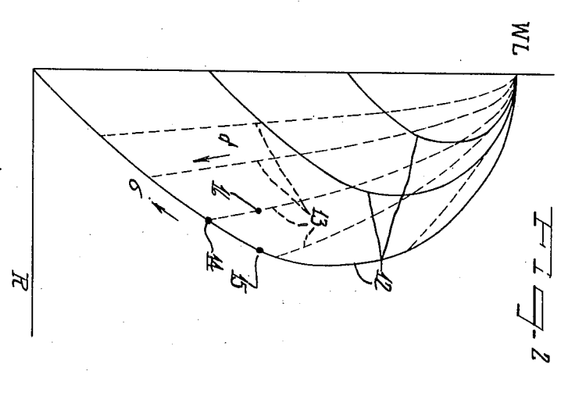
Figure 2 is a graph illustrating the relative changes in inductive reactance and resistance with changes in certain physical characteristics of the article under test in Figure 1 with respect to the test coil.

Reference numeral 10 in Figure 1 designates a generally cylindrical test piece of conductive material which is placed inside a solenoid test coil 11. Figure 2 is a graphical illustration of the relative changes in inductive reactance and resistance with changes in the physical character of the test piece 10 and its relation to the test coil 11. The solid lines 12 in the graph illustrate changes in inductance reactance and resistance with the diameter of the test piece 10 constant for each of the solid lines, the conductivity of the test piece 10 being varied. The dotted lines 13 illustrate the changes in inductive reactance and resistance which take place when the conductivity of the test piece 10 is maintained constant but the diameter of the test piece 10 relative to the inside diameter of the test coil 11 varied.

With a test piece 10 having a given diameter and a given conductivity, the inductive reactance and resistance of the test coil 11 might, for example, be at a point such as indicated by reference numeral 14 on the graph of Figure 2. If a test piece having the same diameter but of a different material so as to have less conductivity were then placed in the test coil 11, the test coil might have an inductive reactance and resistance as represented by reference numeral 15 in the graph of Figure 2. With a test piece of the same material and of the same conductivity but with a smaller diameter, on the other hand, the inductive reactance and resistance would be changed along a dotted line to values as represented by the point 16 on the graph of Figure 2.

It might here be noted the narrow crack or defect in the test piece produces a change in inductive reactance and resistance the same as if the conductivity of the test piece were changed. Thus the changes in inductive reactance and resistance produced by a change in diameter is very different from the changes produced by a crack or the like defect. It will, accordingly, be appreciated that either a change in diameter or a change in conductivity as might be produced by a defect may be indicated independently and irrespective of a variation or change in the other.

Figure 3:
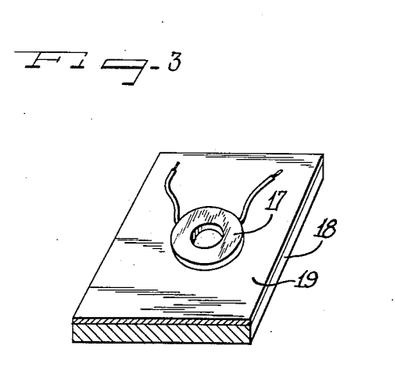
Figure 3 is a perspective view of another test coil arrangement in which the test coil is placed against a structure under test.

Figure 3 is a perspective view of another test coil arrangement in which a coil 17 is placed flat against a test piece 18 with the axis of the test coil 17 normal to the surface of the test piece 18. With this arrangement, the inductive reactance and effective resistance of the test coil 17 may vary according to the graph of Figure 4.

Figure 4:
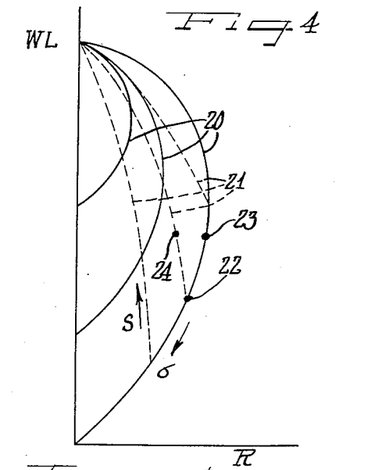
Figure 4 is a graph illustrating the relative changes in inductive reactance and resistance for changes in the physical character of the test piece and its physical relation to the test coil in the arrangement of Figure 3.

If the spacing between the coil 17 and the test piece 18 should be a constant value, that is, if the thickness of a non-conductive coating 19 on the test piece 18 should be a constant value, the inductive reactance and resistance of the test coil will vary along the solid lines 20 in the graph of Figure 4. If, on the other hand, the conductivity of the test piece 18 is constant and the spacing between the test coil 17 and the test piece 18 varied as by changing the thickness of the coating 19, then the inductive reactance and resistance will vary along the dotted lines 21 in the graph of Figure 4.

For example, with a test piece 18 having a given conductivity and with a given thickness of the coating 19, the inductive reactance and resistance of the test coil might be as represented by the point 22 in the graph of Figure 4. If the conductivity of the test piece 18 were then decreased, the inductive reactance and resistance of the test coil 17 might be changed to values as represented by point 23 in the graph of Figure 4. On the other hand, if the spacing between the test coil 17 and the test piece 18 were increased as by increasing the thickness of the coating 19, the inductive reactance and resistance of the test coil 17 might be changed to values as determined by the point 24 in the graph of Figure 4.

As in the case of the arrangement of Figures 1 and 2, a narrow crack or defect in the test piece 18 of the arrangement of Figures 3 and 4 will have substantially the same effect as a decrease in conductivity.

In addition to the spacing between the test coil 17 and the test piece 18 and the conductivity of the test piece 18, there is another variable which may affect the inductive reactance and resistance of the test coil 17. That variable is the thickness of the test piece 18 which will produce a change in inductive reactance and resistance entirely different from the changes produced by changes in spacing and conductivity. This is not illustrated in Figure 4 but it will be understood that, if desired, the thickness of a test piece 18 might be measured independently of other variations according to the principles of this invention.

Figure 5:
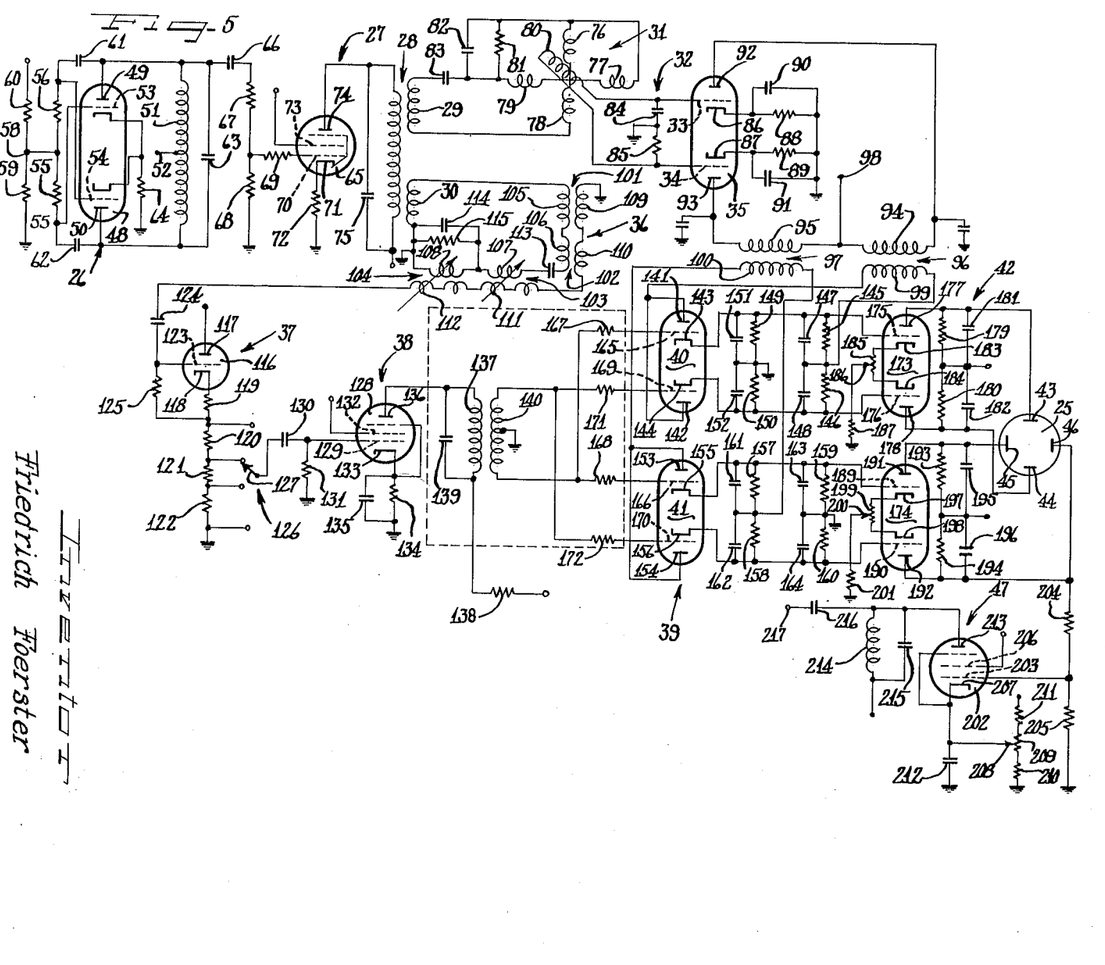
Figure 5 is a circuit diagram of a preferred application of the invention in which changes in the physical characteristics of a structure are indicated by movements of a dot on the face of an oscilloscope.

A circuit diagram of a preferred form of instrument constructed according to this invention is illustrated in Figure 5. This instrument utilizes a cathode ray or oscilloscope tube to indicate the physical characteristics of a structure under test. The oscilloscope tube is designated by reference numeral 25 and has the conventional electron gun arrangement (not illustrated) by which a stream of electrons is focused at a spot on the tube. With this instrument, the spot is deflected in a direction determined by the particular characteristic of the structure under test which is changed, the magnitude of the deflection being determined by the magnitude of the change of the particular physical characteristic.

In general, this instrument comprises an oscillator 26 for generating an alternating current electrical signal which is applied to an amplifier 27 having an output transformer 28 which has two secondaries 29 and 30. The former 28 which has two secondaries 29 and 30. The secondary 29 is connected to an adjustable phase shifter 31 the output of which is applied through a phase splitter circuit 32 to the input grids 33 and 34 of a twin triode amplifier tube 35.

The secondary 30 of the transformer 28 is connected to a test coil circuit generally designated by reference numeral 36 which has an output applied to a cathode follower 37. The output of the cathode follower 37 is amplified by an amplifier 38.

The output of the amplifier 38 and the outputs of the twin triode amplifier tube 35 are applied to a phase detector circuit generally designated by reference numeral 39 which includes two twin triode vacuum tubes 40 and 41.

This phase detector circuit 39 is by itself an important feature of this invention and will be described in detail hereinafter. In general it produces four unidirectional voltages which have relative magnitudes determined by the magnitude and phase of the output from the test coil circuit 36 relative to the magnitude and phase of the output from the phase shifter 31. These four unidirectional voltages are applied through a direct-current amplifier circuit generally designated by reference numeral 42 to four deflection plates 43, 44, 45 and 46 of the cathode ray tube 25.

In operation, the circuit is balanced with a test piece of certain physical characteristics in a certain physical relation to the test coil circuit and a dot is positioned at a certain point on the face of the cathode ray tube 25, preferably at the center. If either the physical character of the test piece or its relation to the coil assembly is then changed, the dot will be deflected in a direction determined by which characteristic is changed and by an amount determined by the magnitude of the change in the particular characteristic. For example, if the diameter of the test piece should be changed, the dot might be deflected at an angle of 60° relative to the horizontal while if the conductivity were changed, the dot might be deflected at only an angle of 25° relative to the horizontal. If it should be desired that the dot be deflected in a given direction for a change in a particular characteristic, the phase shifter 31 may be adjusted to accomplish this result. For instance, if in the example described immediately above, it should be desired to have a horizontal deflection of the spot with a change in diameter, the phase shifter 31 may be adjusted so that such will result. A change in conductivity would then result in a deflection of the spot in a direction at 35° relative to the horizontal.

Another feature of this invention is in the provision of a circuit by which a signal may be made or a control device actuated when and only when a change in a particular characteristic occurs. This comprises an amplifier 47 which is connected to one of the deflection plates, plate 46 as illustrated, of the cathode ray tube 25. If, for example, it is desired to actuate a signal device or a control device when a change in diameter of a test piece occurs, the phase shifter 31 may be adjusted to a position in which a change in conductivity causes only a vertical deflection of the spot on the face of the cathode ray tube 25, that is, a change in the relative potentials of the plates 43 and 44 without changing the potentials of the deflection plates 45 and 46. Then with only a change in conductivity, no signal will be received by the amplifier 47 but a change in diameter will cause the amplifier 47 to operate the control or signal device.

With the above description of the general construction and operation of the instrument of Figure 5 in mind, the various components and circuits will now be described in detail so as to enable those versed in the art to more readily construct and operate the instrument.

The oscillator 26 has a somewhat conventional circuit and includes a twin triode vacuum tube 48 having plates 49 and 50 connected to opposite ends of an inductance 51 having a center tap 52 connected to a source of positive potential, preferably 150 volts, with respect to ground. The tube 48 also has grids 53 and 54 connected through grid lead resistors 55 and 56, respectively, to a junction point 58 between resistors 59 and 60 connected respectively to ground and to a source of positive potential, preferably 150 volts, with respect to ground. Feed back between the plate and grid circuits is provided by means of capacitors 61 and 62 connected respectively between the grid 54 and the plate 49 and between the grid 53 and the plate 50. The plate inductance 51 is tuned by means of capacitor 63 thereacross so that the oscillator operates at a frequency which is preferably about 30 kilocycles although any desired frequency may be used. The cathodes of the twin triode tube 48 are connected together and through a resistor 64 to ground, the current flow through this resistor together with the potential point 58 and the voltage developed across resistors 55 and 56 in operation determining the grid bias for the tube 48.

The amplifier stage 27 comprises a tetrode vacuum tube 65, preferably a power amplifier beam power tube tuch as type 6V6. The output of the oscillator 26 is connected through a coupling capacitor 66 and a voltage divider resistor network including resistors 67 and 68 and through a grid current limiting resistor 69 to the control grid 70 of the tube 65. The cathode 71 is connected through a bias resistor 72 to ground while the screen grid 73 is connected to a source of positive potential with respect to ground. The plate 74 is connected through the primary of the transformer 28 to a source of positive potential, preferably 280 volts, with respect to ground with a capacitor 75 connected across the primary of the transformer 28 and tuning the same to a resonance at the frequency of operation.

The phase shifter 31 comprises four stationary coils 76, 77, 78 and 79 arranged with the axes of coils 76 and 78 aligned and at right angles to the axes of the coils 77 and 79, and a movable coil 80 arranged for rotation about an axis normal to the axes of the coils 76, 77, 78 and 79. The coils 76, 77, 78 and 79 are connected to the transformer secondary 29 through a network including resistor 81 and capacitors 82 and 83 by which the current flow through the series connected coils 76 and 78 is 90° out of phase with the current flow through the series connected coils 77 and 79. The coil 80 may be rotated into any desired position relative to the coils 76, 77, 78 and 79 so as to obtain any desired phase relation with respect to the voltage at the transformer secondary 29, the voltage at the coil 80 being substantially constant regardless of its position.

The output of the phase shifter 31, at the coil 80, is connected across the phase splitter circuit 32 which consists of a capacitor 84 and a resistor 85 connected in series with the junction therebetween connected to ground. The voltage appearing across the capacitor 84 is approximately 90° out of phase with the voltage across the resistor 85. Thus the voltages applied to the grids 33 and 34 of the twin triode vacuum tube 35 are 90° out of phase. The tube 35 has cathodes 86 and 87 associated with the grids 33 and 34, respectively, and connected to ground through resistors 88 and 89, respectively, by-pass capacitors 90 and 91 being connected across the cathode bias resistors 88 and 89, respectively. The tube 35 also has plates 92 and 93 associated respectively with the grids 33 and 34 and connected respectively through the primaries 94 and 95 of a pair of transformers 96 and 97 to a terminal 98 which is at a high positive potential, preferably 280 volts, with respect to ground. The transformers 96 and 97 have secondaries 99 and 100 which are connected to the phase sensitive detector circuit 39 in a manner to be hereinafter described. The voltages across the secondaries 99 and 100 are substantially equal, are 90° out of phase with respect to each other and have a phase relation with respect to the secondary 29 of the transformer 28 which depends upon the position of the movable coil 80 of the adjustable phase shifter 31.

The test coil circuit 36 might comprise merely a coil such as either coil 11 or coil 17 of Figures 1 and 3 connected in series with an impedance element such as a capacitor across the transformer secondary 30 with the voltage across the coil applied to the input of the cathode follower stage 37. Preferably, however, the more complex, flexible and reliable circuit illustrated in Figure 5 is used. This circuit includes two fixed transformers 101 and 102 and two variable transformers 103 and 104 having primaries 105, 106, 107 and 108, respectively, connected in series across the transformer secondary 30 and having series connected secondaries 109, 110, 111 and 112, respectively, forming the output of the test coil circuit 36.

The primary and secondary coils 105 and 109 of the transformer 101 are arranged to be loaded by a test piece preferably in a manner similar to the loading of coil 11 by test piece 10 in Figure 1. The coils 106 and 110 of the transformer 102 are arranged to be loaded in a similar manner by a standard test piece which serves a calibrating function. A capacitor 113 in series with the transformer primaries 105, 106, 107 and 108 and a capacitor 114 and resistor 115 across the primary 108 serve to establish an optimum phase relation between the transformer primaries. The transformers 103 and 104 may then be adjusted to obtain the desired output voltage from the test coil circuit 36. In operation, the transformers will normally be adjusted to obtain a "null" or no output voltage with test pieces of standard or known characteristics in both transformers 101 and 102.

The cathode follower stage 37 comprises a triode tube 116 having a plate 117 connected to a source of positive potential, preferably 150 volts, with respect to ground, a cathode 118 connected through resistors 119, 120, 121 and 122 to ground and a grid 123 connected through a coupling capacitor 124 to the output of the test coil assembly 36 and also a resistor 125 to the junction between resistors 119 and 120 in the cathode circuit. This cathode follower circuit operates in a conventional well known manner and the output therefrom appears across the series connected cathode resistors 119, 120, 121 and 122. The junctions between these resistors are connected to the fixed contacts of a sensitivity switch 126 having a movable contact 127 arranged for selective cooperation with any one of the fixed contacts. This switch 126 has four positions as illustrated but it will be understood that it may have any number of positions depending upon the fineness of control desired.

The amplifier stage 38 comprises a pentode vacuum tube 128 having a control grid 129 connected through a coupling capacitor 130 to the movable contact 127 of the selector switch 126 and also through a resistor 131 to ground, a screen grid 132 connected to a source of positive potential with respect to ground, a cathode 133 connected through a cathode bias resistor 134 to ground with a by-pass capacitor 135 across the resistor 134, and a plate 136 connected through a transformer primary 137 and a resistor 138 to a source of high positive potential with respect to ground, a capacitor 139 being connected in parallel with the transformer primary 137 to tune the same to a resonance at the operating frequency of the instrument which is, as pointed out above, preferably 30 kilocycles. The output of the amplifier 38 appears at the transformer secondary 140 which is inductively coupled to the primary 137 and which has a center tap connected to ground. This output varies in phase and amplitude in a manner as determined by the physical characteristics of test cases placed in the test coil assembly 36.

The phase detector circuit 39 comprises the two twin triode vacuum tubes 40 and 41. The two sections of the twin triode tube 40 have plates 141 and 142 connected together and to one end of the secondary 99 of transformer 96 and have cathodes 143 and 144 associated respectively with the plates 141 and 142 and connected through resistors 145 and 146, respectively, to the other end of the secondary 99 of the transformer 96, by-pass capacitors 147 and 148 being connected in parallel with the resistors 145 and 146, respectively. The cathodes 143 and 144 are also connected through resistors 149 and 150, respectively, to ground with by-pass capacitors 151 and 152, respectively, connected across the resistors 149 and 150.

The two triode sections of the tube 41 are similarly connected to the secondary 100 of the transformer 97 and have plates 153 and 154 connected together and to one end of the secondary 100 and cathodes 155 and 156 associated respectively with the plates 153 and 154 and connected through resistors 157 and 158, respectively, to the other end of the secondary 100 and also through resistors 159 and 160 to ground with by-pass capacitors 161, 162, 163 and 164 connected across the resistors 157, 158, 159 and 160, respectively.

A grid 165 associated with plate 141 and cathode 143 and a grid 166 associated with the plate 153 and the cathode 155 are connected through resistors 167 and 168 to one side of the transformer secondary 140 while a grid 169 associated with the plate 142 and the cathode 144 and a grid 170 associated with the plate 154 and the cathode 156 are connected through resistors 171 and 172, respectively, to the other side of the transformer secondary 140.

With no voltage across the transformer secondary 140, the equal voltages across the transformer secondaries 99 and 100, which are 90° out of phase, are rectified by the tubes 40 and 41 and produce substantially equal voltages across the resistors 145, 146, 157 and 158 so that the cathodes 143, 144, 155 and 156 are at substantially equal potentials with respect to ground. When there is a voltage across the transformer secondary 140, the potential of one or more of the cathodes 143, 144, 155 and 156 will be changed with respect to ground depending upon the phase relation between the voltage across the secondary 140 with respect to the phases of the voltages across the transformer secondaries 99 and 100. The magnitude of the change in potential of the cathodes will be dependent, of course, upon the magnitude of the voltage across the secondary 140. If, for example, the voltage across the secondary 140 from the bottom end to the top end thereof should be in phase with the voltage developed across the transformer secondary 99 from the right end thereof to the left end thereof, then the current flow between the cathode 144 and the plate 142 will be greatly increased while the current flow between the cathode 143 and plate 141 will be greatly decreased, thereby increasing the potential of the cathode 144 with respect to ground while decreasing the potential of the cathode 143 with respect to ground. In the tube 41, the plate voltage is 90° out of phase with respect to the grid voltage in each section so that the relative potentials of the cathodes 155 and 156 is not changed. On the other hand, if the voltage across the transformer secondary 140 should be in phase with the voltage across the transformer secondary 100, then the relative potentials of the cathodes 155 and 156 will be changed while the relative potentials of the cathodes 143 and 144 will remain the same. If the voltage across the transformer secondary 140 is out of phase with respect to both transformer secondary 99 and transformer secondary 100, then the potentials of all of the cathodes 143, 144, 155 and 156 will be changed depending upon the relative phase relation of the grid voltage and the plate voltage of the associated tube sections.

The direct current amplifier 42 comprises two twin triode vacuum tubes 173 and 174. The tube 173 has a pair of grids 175 and 176 connected respectively to the cathodes 143 and 144, a pair of plates 177 and 178 connected respectively to deflection plates 43 and 44 of the cathode ray tube 25 and also through resistors 179 and 180 to a source of high positive potential with respect to ground with capacitors 181 and 182 connected respectively across the resistors 179 and 180, and a pair of cathodes 183 and 184 connected to opposite ends of a potentiometer 185 having a movable contact 186 connected through a resistor 187 to ground.

The tube 174 has a pair of grids 189 and 190 connected respectively to the cathodes 155 and 156, has a pair of plates 191 and 192 connected respectively to the deflection plates 45 and 46 of the cathode ray tube 25 and also through resistors 193 and 194 to a source of high positive potential with respect to ground with capacitors 195 and 196 connected respectively across the resistors 193 and 194, and has a pair of cathodes 197 and 198 connected to opposite ends of a potentiometer 199 having a movable contact 200 connected through a resistor 201 to ground. The circuit 42 thus serves to amplify the voltages of the cathodes 143, 144, 155 and 156 of the phase-sensitive detector circuit to control the vertical and horizontal deflection plates of the cathode ray tube 25.

The amplifier 47 comprises a pentode vacuum tube 202 having a grid 203 connected through resistor 204 to the deflection plate 46 of the cathode ray tube 25 and also through a resistor 205 to ground, a screen grid 206 connected to a source of positive screen voltage, a cathode 207 connected to a movable contact 208 of a potentiometer 209 connected through resistors 210 and 211 between ground and a source of positive potential with respect to ground with a by-pass capacitor 212 connected between the cathode and ground, and a plate 213 connected through a tank circuit comprising inductance 214 and capacitor 215 to a source of high positive potential, the plate 213 also being connected through a capacitor 216 to an output terminal 217 which may be connected to an electronic switch or any desired signal or control device which it is desired to actuate when the voltage of one of the deflection plates such as the plate 46 of the cathode ray tube 25 is increased.

Figures 6, 9, 10:
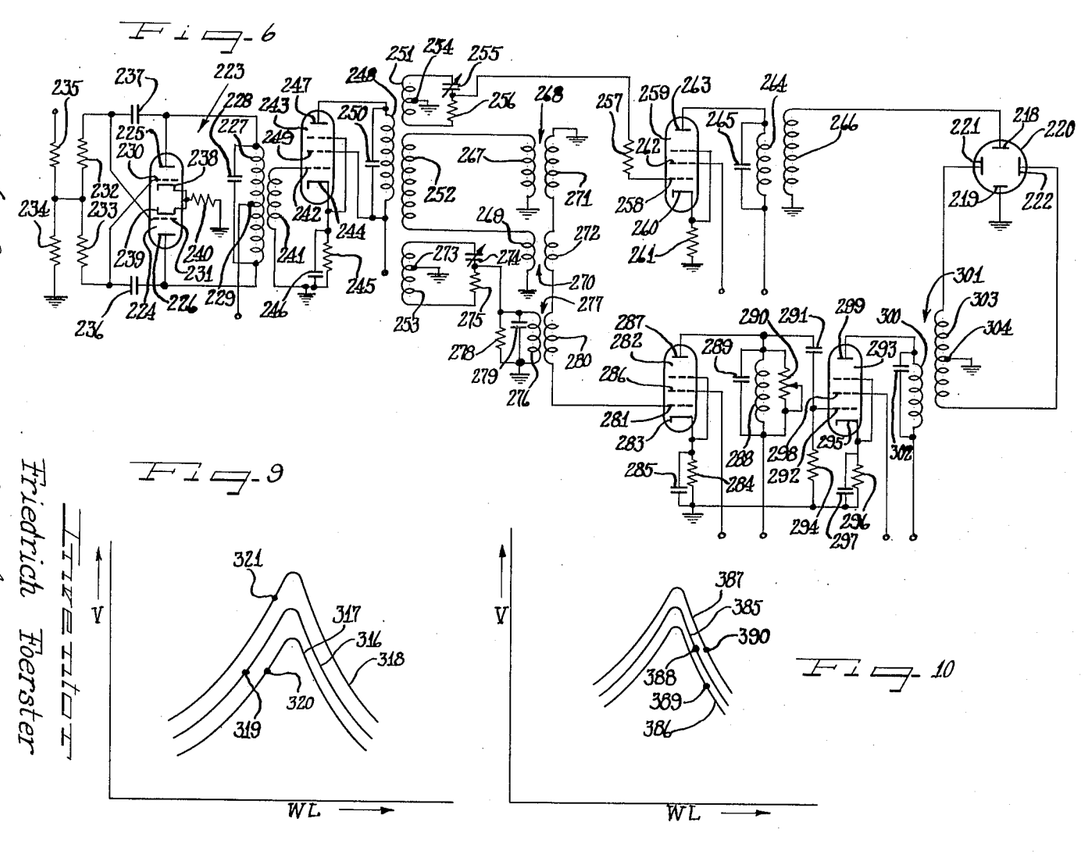
Figure 6 is a circuit diagram of another preferred application of the invention in which the physical characteristic of a structure under test is indicated by changes in a pattern developed on the face of an oscilloscope.
Figure 9 is a graph illustrating the operation of the arrangement of Figure 7.
Figure 10 is a graph illustrating the operation of the arrangement of Figure 8.

Referring now to Figure 6, a circuit diagram of another preferred form of the instrument is illustrated. In the instrument of Figure 6, an adjustable phase alternating electrical signal is applied to one pair of deflection plates 218 and 219 of a cathode ray tube 220 while another alternating current signal having an amplitude and phase determined by the character of a structure under test is applied to a second set of deflection plates 221 and 222 of the cathode ray tube 220. The relative phase of the signals may be adjusted so that a straight line appears on the face of the cathode ray tube 220. The circuit is such that with a change in one physical characteristic of the structure under test, only the relative phase of the two signals will be changed so that a loop which may be in the form of an ellipse or a circle will appear on the face of the cathode ray tube 220. With a change in a different characteristic of the structure under test, a change in the relative magnitude only of the two signals will take place and a straight line will still appear on the face of the cathode ray tube 220 but will run in a different direction depending upon the difference in magnitude of the two signals.

In detail, the instrument of Figure 6 comprises an oscillator 223 including a twin triode vacuum tube 224 having plates 225 and 226 connected to opposite ends of a transformer primary 227 which has a capacitor 228 connected thereacross to tune the same to resonance and which has a center tap 229 connected to a source of high positive potential with respect to ground, a pair of grids 230 and 231 connected together through series connected resistors 232 and 233 with the junction between the resistors 232 and 233 connected through a resistor 234 to ground and through a resistor 235 to a source of high positive potential with respect to ground, the grids 230 and 231 being connected through capacitors 236 and 237 to the plates 225 and 226, respectively, and a pair of cathodes 238 and 239 connected together and through a resistor 240 to ground. This circuit is, in effect, a push-pull Hartley oscillator and the capacitor 228 tunes the transformer primary 227 to a resonance at about 30 kilocycles, preferably, although any desired frequency of operation may be used. A transformer secondary 241 inductively coupled to the primary 227 is connected at one end to ground and at the other end to a grid 242 of a pentode vacuum tube 243 which functions as an amplifier and has a cathode 244 connected through a bias resistor 245 to ground with a by-pass capacitor 246 connected thereacross, a plate 247 connected to one end of a transformer primary 248, and a screen grid 249 connected to the other end of the transformer secondary 248 and to a source of high positive potential with respect to ground, a capacitor 250 being provided to tune the transformer primary 248 to a resonance at the operating frequency of the instrument.

Three transformer secondaries 251, 252 and 253 are inductively coupled to the primary 248. The secondary 251 has a center tap 254 connected to ground and is connected to a variable capacitor 255 in series with a resistor 256. By adjustment of the variable capacitor 255, the phase of the voltage between the ground and the junction between the capacitor 255 and the resistor 256 is varied. This junction is connected through a resistor 257 to the control grid 258 of a pentode vacuum tube 259 which serves as an amplifier and which has a cathode 260 connected to ground through a bias resistor 261, a screen grid 262 connected to a source of positive screen voltage, and a plate 263 connected through a transformer primary 264 to a source of high positive potential with respect to ground, a capacitor 265 being connected across the transformer primary 264 to tune the same to a resonance at the operating frequency of the instrument. A transformer secondary 266 is inductively coupled to the primary 264 and is connected to the deflection plates 218 and 219 of the cathode ray tube 220.

Accordingly, by adjustment of the variable capacitor 255, the phase of the alternating current signal applied to the deflection plates 218 and 219 may be varied.

The transformer secondary 252 which is inductively coupled to the transformer primary 248 is connected at one end to a primary 267 of a transformer 268 to ground and at the other end through a primary 269 of a transformer 270 to ground. The transformer 268 has a secondary 271 and the transformer is arranged to be loaded by a test piece preferably in a manner similar to the loading of coil 11 by test piece 10 in Figure 1. The transformer 270 has a secondary 272 and may be either a fixed ratio transformer or may be arranged to be loaded by a standard test piece in a manner similar to the loading of coil 11 by test piece 10 in Figure 1 so as to serve a calibrating function.

The secondary 253 which is inductively coupled to the primary 248 has a center tap 273 and is connected to a variable capacitor 274 in series with a resistor 275. The voltage between ground and the junction between capacitor 274 and resistor 275 has a phase dependent upon the capacitance of the variable capacitor 274. The junction is connected through a primary 276 of a transformer 277 to ground with a resistor 278 and a capacitor 279 connected across the transformer primary 276. The transformer 277 has a secondary 280 connected in series with the transformer secondaries 271 and 272 between ground and the control grid 281 of a pentode amplifier tube 282. The variable capacitor 274 may be adjusted in a manner such that the voltage applied to the grid 281 with a change in one physical characterictis of a test piece loading the transformer 268 will be the proper amount out of phase with a voltage produced by a change in a different physical characteristics of a test piece loading the transformer 268.

The tube 282 has a cathode 283 connected through a bias resistor 284 to ground with a by-pass capacitor 285 across the resistor 284, a screen grid 286 connected to a source of positive screen voltage, and a plate 287 connected through an inductance 288 to a source of high positive potential with respect to ground, a capacitor 289 being provided to tune the inductance 288 to resonance at the frequency of operation of the instrument and a rheostat 290 being connected across the inductance 288 to adjust the "Q" of the inductance.

The plate 287 of the amplifier tube 282 is coupled through a coupling capacitor 291 to a control grid 292 of a pentode amplifier tube 293, the control grid 292 being connected through a grid leak resistor 294 to ground. The tube 293 serves an amplifying function and has a cathode 295 connected through a bias resistor 296 to ground with a bypass capacitor 297 connected thereacross, a screen grid 298 connected to a source of screen voltage, and a plate 299 connected through a primary 300 of a transformer 301 to a source of high positive potential with respect to ground, a capacitor 302 being provided to tune the primary 300 to resonance at the frequency of operation of the instrument.

The transformer 301 has a secondary 303 which has a center tap 304 connected to ground and which is connected to the deflection plates 221 and 222 of the cathode ray tube 220.

In operation, a test piece may be disposed in inductive relation to the primary 267 and secondary 271 of the test transformer 268 and the variable capacitors 255 and 274 may be adjusted in a manner such that alternating electrical signals applied to the deflection plates of the cathode ray tube 220 are in phase and a straight line appears on the face of the cathode ray tube 220. If, then, a physical characteristic such as, for example, the diameter of a test piece in the test transformer 268 should change, a change in the relative phase of the voltages applied to the deflection plates of the cathode ray tube 220 might take place and an open loop would appear on the face of the cathode ray tube 220. With a change in a different characteristic such as the conductivity of the test piece, a change in the relative magnitude, only, of the voltages applied to the deflection plates of the cathode ray tube 220 might take place and a straight line would still appear on the face of the tube but the line would be at a different angle. It will be appreciated that with the two variable capacitors 255 and 274, the instrument is sufficiently flexible so that the indication for any particular characteristic under test may take any desired form. In any event, it is readily possible to distinguish between a change in loading of the test transformer 268 caused by a change in one physical characteristic of a structure under test from a change in loading caused by a different characteristic.

Figure 7:
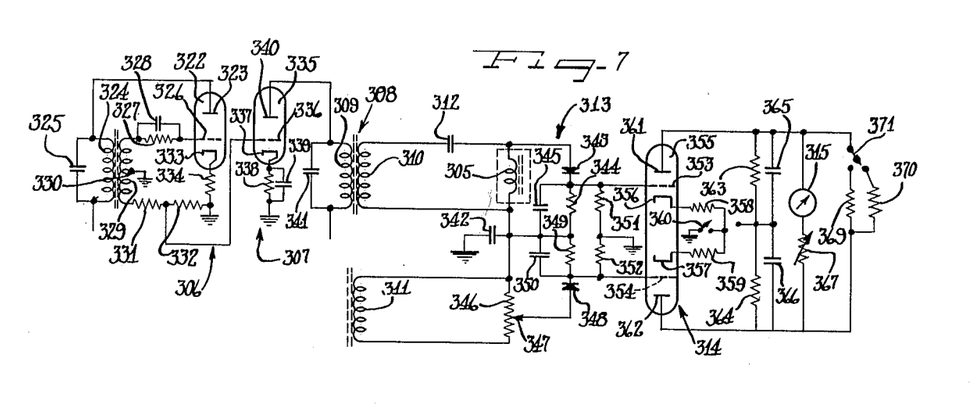
Figure 7 is a circuit diagram of still another preferred application of the invention in which a meter or the like is used as an indicator with a change in one physical characteristic of the structure under test producing no change in the indication while a change in another physical character of the structure will produce a change in the indication.

Figure 7 is a circuit diagram for another preferred form of instrument according to this invention. This instrument is preferably used to measure the thickness of a non-conductive coating on a conductive base and uses a test coil of a form similar to the test coil 17 of Figure 3. When this probe coil is placed on the coating, it will have an inductive reactance and resistance which is dependent upon the thickness of the coating and the conductivity of the base according, for example, to the graph of Figure 4.

The instrument of Figure 7 includes, in general, an oscillator 306 having an alternating current output amplified by an amplifier 307 which has an output transformer 308 having one primary winding 309 and two secondary windings 310 and 311. The probe or test coil 305 is connected in series with a capacitor 312 to the secondary 310. The voltage appearing across the test coil 305 will depend upon the loading of the same.

To measure the voltage across the test coil 305, it is balanced against the voltage across the secondary 311 which is hence used as a reference voltage. The two voltages are fed to a bridge detector circuit generally designated by reference numeral 313 which produces two direct current output voltages corresponding to the alternating voltages across the test coil 305 and the secondary 311 and of opposite polarity. These direct voltages are applied through a direct current amplifier generally designated by reference numeral 314 to a meter 315 which indicates the difference between the reference voltage across the secondary 311 and the voltage across the test coil 305.

A highly important feature of this instrument is in the operation of it in a manner such that it is highly sensitive to differences in the thickness of the non-conductive coating but is insensitive, within practical limits, to changes in the conductivity of the conductive material. This feature will be best understood by first referring to Figure 4 which, as described above, shows the variance of inductive reactance and resistance of the test coil 17 with variations in the thickness of the coating 19 and with variations in the conductivity of the base 18 and with reference to Figure 9 which is a graph illustrating the voltage across an inductance in a series resonant circuit with changes in inductive reactance and resistance.

As described above in connection with Figures 3 and 4, point 22 in the graph of Figure 4 represents the inductive reactance and resistance for a test piece having a given conductivity and a coating of given thickness. Point 23 in the graph represents the inductive reactance and resistance with a change in the conductivity only of the test piece, while point 24 represents the inductive reactance and resistance with a change in the thickness only of the coating. In Figure 9, curve 316 is a plot of the voltage across the test coil 305 with changing inductive reactance and with a constant resistance equal to the resistance as represented by point 22 on the graph of Figure 4. Curve 317 is obtained with a resistance as represented by point 23 in the graph of Figure 4 and curve 318 is obtained with a resistance as represented by point 24 in the graph of Figure 4. Point 319 on curve 316 is the point of operation in the graph of Figure 9 when the inductive reactance and resistance are as represented by point 22 in the graph of Figure 4. Point 320 on curve 317 is the point of operation in the graph of Figure 9 when the inductive reactance and resistance are as represented by point 23 in the graph of Figure 4 and point 321 on curve 318 is the point of operation with the inductive reactance and resistance as represented by point 24 in the graph of Figure 4.

It will be noted that with a change in inductive reactance and resistance from point 22 to point 23 in Figure 4 caused by a change in the conductivity, only, of the test piece, the point of operation in Figure 9 will be changed from point 319 to 320 and the voltage across the test coil will not be changed. However, with a change in inductive reactance and resistance from point 22 to point 24 in the graph of Figure 4, as caused by a change in thickness, only, of the coating, the point of operation in Figure 9 will be changed from point 319 to 321 and a large change in the voltage across the probe coil will result. Accordingly, by operating the instrument of Figure 7 at a frequency below the resonant frequency of the resonant circuit including capacitor 312 and test coil 305, the instrument is insensitive to changes in conductivity of the base but is very sensitive to changes in the thickness of the coating on the base. The meter 315 may, if desired, be calibrated to read the thickness of a coating directly and the reading obtained will not be changed by changes in conductivity due to changes in the nature of the base or the presence of small cracks or defects in the base.

In more detail, the oscillator circuit 306 of the instrument of Figure 7 comprises a triode vacuum tube 322 having a plate 323 connected through transformer primary 324 to a source of high positive potential with respect to ground with a capacitor 325 provided to tune the transformer primary 324 to resonance at the desired operating frequency of the instrument, a grid 326 connected through a grid leak resistor 327 in parallel with a grid leak capacitor 328 to one end of a transformer secondary 329 inductively coupled to the primary 324 and having a center tap 330 connected to ground and having the other end connected to ground through series connected resistors 331 and 332, and a cathode 333 connected through a bias resistor 334 to ground. In essence, this circuit is similar to the conventional Hartley oscillator circuit. The output of the circuit appears at the junction between the resistors 331 and 332.

The amplifier 307 comprises a triode vacuum tube 335 having a grid 336 connected to the output of the oscillator stage 306 at the junction between resistors 331 and 332, a cathode 337 connected through a bias resistor 338 to ground with a by-pass master 339 thereacross, and a plate 340 connected to one end of the transformer primary 309, the other end of the primary being connected to a source of high positive potential with respect to ground and a capacitor 341 being connected across the primary 309 to tune the same to resonance at the operating frequency of the instrument.

In the bridge detector circuit generally designated by reference numeral 313, one end of the test coil 305 is connected directly to one end of the transformer secondary 311 and through a by-pass capacitor 342 to ground. The other end of the test coil 305 is connected through a rectifier 343 and through a resistor 344 to the aforementioned one end of the coil 305 with a capacitor 345 connected across the resistor 344.

The transformer secondary 311 is connected to opposite ends of a potentiometer 346 having a movable contact 347 connected through a rectifier 348 and a resistor 349 to the aforementioned one end of the secondary 311, a capacitor 350 being connected across the resistor 349. By these circuits, unidirectional voltages appear across the resistors 344 and 349 in accordance with the alternating voltages across the test coil 305 and the transformer secondary as reduced by adjustment of the potentiometer 346, respectively. The junction between rectifier 343 and resistor 344 and the junction between rectifier 348 and resistor 349 are connected through resistors 351 and 352, respectively, to ground and also to grids 353 and 354 of a twin triode amplifier tube 355 which functions as a direct current amplifier and which has a pair of cathodes 356 and 357 connected respectively through resistors 358 and 359 and through a common switch 360 to ground, and a pair of plates 361 and 362 connected through resistors 363 and 364 to a source of high positive voltage with respect to ground with capacitors 365 and 366 connected respectively across the resistors 363 and 364. The plates 361 and 362 are also connected to the meter 315 with a variable resistor 367 in series with the meter 315 and with resistors 369 and 370 connectible in shunt with the meter 315 and resistor 367 by means of a switch 371. The meter 315 may be thus calibrated by the variable resistor 367 and the resistors 369 and 370 may be used to control the range of the meter.

Figure 8:
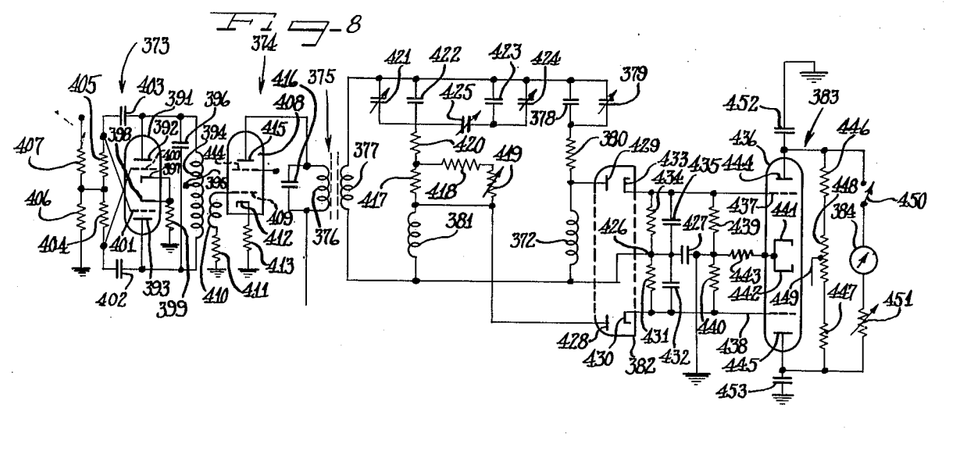
Figure 8 is a circuit diagram of a still further application of the invention which is very similar to the arrangement of Figure 7 but with a reverse operation.

Figure 8 is a schematic diagram of another preferred form of instrument constructed according to this invention. This instrument is somewhat similar to that of Figure 7 and is preferably used to measure conductivity of a test piece instead of the thickness of a coating as is measured by the instrument of Figure 7. The heart of the instrument is in the probe or test coil 372 which is preferably arranged to be disposed flat against a test piece in the manner similar to the arrangement of coil 17 relative to test piece 18 in Figure 3.

The instrument comprises, in general, an oscillator 373 coupled to an amplifier 374 which has an output transformer 375 having a primary 376 and a secondary 377. The secondary 377 is connected to the test coil 372 through a fixed capacitor 378 in parallel with a variable capacitor 379 in parallel with each other and in series with the probe coil 372 through a resistor 380. The voltage across the probe coil 372 is, of course, dependent upon the loading thereof by the structure under test. This voltage is measured by means of a bridge circuit which provides a reference voltage across an inductance 381. The voltage across the test coil 372 and the reference voltage across the inductance 381 are rectified by a circuit including a twin diode tube 382 to provide unidirectional voltages of opposite polarity, these voltages being amplified by a direct current amplifier 383 and applied to a meter 384 which indicates the difference between the voltage across the test coil 372 and the reference voltage across the inductance 381.

A highly important feature of this instrument is in the operation of the same such that it is highly sensitive to changes in conductivity of the structure under test while it is comparatively insensitive to changes in surface conditions between the test coil and the test piece.

This feature will be best understood by reference to Figures 3 and 4 which have been described in detail above and by reference to Figure 10 which is similar to Figure 9. Figure 10 is a plot of the voltage developed across the test coil 372 against the inductive reactance in the series circuit with three different values of resistance in the circuit. Curve 385 is obtained with a constant resistance in the series circuit as represented by point 22 in the graph of Figure 4. Curve 386 is obtained with a fixed resistance as represented by point 23 in the graph of Figure 4 and curve 387 is obtained with a fixed resistance in the series circuit as represented by point 24 in the graph of Figure 4.

Point 388 on curve 385 is the point of operation when the inductive reactance and resistance of the test coil are as represented by reference numeral 22 in Figure 4, while point 389 is the point of operation when the inductive reactance and resistance of the test coil are as represented by point 23 in Figure 4 and point 390 is the point of operation when the inductive reactance and resistance are as represented by reference numeral 24 in Figure 4.

It will be noted that when the operation is changed from point 22 to 23 in Figure 4, the point of operation in Figure 10 will be changed from point 388 to 389 and the voltage across the test coil will be greatly reduced. This will take place when there is a change in conductivity, only, of the test piece. With a change in the spacing between the test coil and test piece, on the other hand, the operation will be changed from point 22 to point 24 in Figure 4 and from point 388 to 390 in Figure 10. With this change in spacing, there will be substantially no change in the voltage across the test coil. Hence, with the series circuit resonant at a frequency higher than the frequency of the alternating voltage, the instrument will be very sensitive to changes in conductivity of the structure under test while being comparatively insensitive to changes in the spacing between the coil and the structure under test.

The oscillator 373, in detail, comprises a twin triode vacuum tube 391 which has a pair of plates 392 and 393 connected together through a transformer primary 394 having a center tap 395 connected to a source of high positive potential with respect to ground and a capacitor 396 connected thereacross to tune the same to resonance at the desired operating frequency of the instrument, preferably, but not necessarily about 60 kilocycles. The tube 391 also has a pair of cathodes 397 and 398 connected together and to ground through a resistor 399 and a pair of grids 400 and 401 connected through capacitors 402 and 403, respectively, to the plates 393 and 392 and connected together through resistors 404 and 405, the junction between the resistors 404 and 405 being connected to ground through a resistor 406 and to a source of positive potential with respect to ground through a resistor 407. This is hence a push-pull oscillator circuit with feed back from the plate of each triode section of the tube 391 to the grid of the opposite section through the capacitors 402 and 403.

The amplifier 374 comprises a tetrode amplifier tube 408 having a grid 409 connected through a transformer secondary 410 inductively coupled to the primary 394 and through a resistor 411 to ground, a cathode 412 connected through a bias resistor 413 to ground, a screen grid 414 connected to a source of high positive potential with respect to ground, and a plate 415 connected through the primary 376 of the transformer 375 to a source of high positive potential with respect to ground, a capacitor 416 being connected in parallel with the primary 376 to tune the same to resonance at the operating frequency of the instrument.

The inductance 381 across which the reference voltage is obtained is connected in series with the parallel combination of a resistor 417 and series connected resistors 418 and 419, in series with a resistor 420 and in series with a mesh of capacitors including capacitors 421, 422, 423, 424 and 425, the series circuit including the inductance 381 being connected across the secondary 377 of the transformer 375.

One end of the inductance 381 is connected together with one end of the test coil 372 to a junction point 426 which is connected to ground through a by-pass capacitor 427. The other end of the inductance 381 is connected to one plate 428 of the twin diode 382, while the other end of the test coil 372 is connected to a plate 429 of the twin diode 382. The tube 382 has a cathode 430 associated with the plate 428 and connected through the parallel combination of a resistor 431 and a capacitor 432 to the junction point 426 and has a cathode 433 associated with the plate 429 and connected through the parallel combination of a resistor 434 and a capacitor 435 to the junction point 426. Unidirectional voltages are developed across the resistors 431 and 434 which are of opposite polarity and which correspond to the alternating reference voltage across the inductance 381 and the alternating voltage across the test coil 372, respectively.

The direct current amplifier 383 comprises a twin triode vacuum tube 436 having grids 437 and 438 connected to the cathodes 433 and 430, respectively, of the tube 382 and also connected through resistors 439 and 440 to ground. The tube 436 also has a pair of cathodes 441 and 442 connected together and through a resistor 443 to ground and a pair of plates 444 and 445 connected through resistors 446 and 447, respectively, to opposite ends of a potentiometer 448 having a center tap 449 connected to a source of high positive potential with respect to ground. The meter 384 is connected in series with a switch 450 and a variable resistor 451 to the plates 444 and 445 and thus indicates any difference in the relative potential of the two plates. If desired, capacitors 452 and 453 may be connected between ground and the plates 444 and 445, respectively.

It will be understood that modifications and variations may be effected without departing from the spirit and scope of the novel concept of the present invention.

I claim as my invention:

1. In testing apparatus, a source of alternating current, a test coil coupled to said source and arranged to be loaded by structure under test, a phase splitter circuit coupled to said source and arranged to produce first and second reference signals approximately 90 degrees out of phase relative to each other, a first detector circuit responsive to said first reference signal and a test signal derived from said coil for developing a first unidirectional voltage proportional to the component of said test signal in phase with said first reference signal, a second detector circuit responsive to said second reference signal and said test signal for developing a second unidirectional voltage proportional to the component of said test signal in phase with said second reference signal, indicating means including a screen and means for producing a spot of light on said screen, means responsive to one of said unidirectional voltages for deflecting said spot in one direction, and means responsive to the other of said unidirectional voltages for deflecting said spot in a transverse direction.

2. In testing apparatus, a source of alternating current, a test coil coupled to said source and arranged to be loaded by structure under test, a phase splitter circuit coupled to said source and arranged to produce first and second reference signals approximately 90 degrees out of phase relative to each other, a first detector circuit responsive to said first reference signal and a test signal derived from said coil for developing a first unidirectional voltage proportional to the component of said test signal in phase with said first reference signal, a second detector circuit responsive to said second reference signal and said test signal for developing a second unidirectional voltage proportional to the component of said test signal in phase with said second reference signal, indicating means including a screen and means for producing a spot of light on said screen, means responsive to one of said unidirectional volatges for deflecting said spot in one direction, means responsive to the other of said unidirectional voltages for deflecting said spot in a transverse direction, and an adjustable phase shifter arranged for coupling said phase-splitter circuit to said source.

3. In testing apparatus, a source of alternating current, a test coil coupled to said source and arranged to be loaded by structure under test, a phase splitter circuit coupled to said source and arranged to produce first and second reference signals approximately 90 degrees out of phase relative to each other, a first detector circuit responsive to said first reference signal and a test signal derived from said coil for developing a first unidirectional voltage proportional to the component of said test signal in phase with said first reference signal, a second detector circuit responsive to said second reference signal and said test signal for developing a second unidirectional voltage proportional to the component of said test signal in phase with said second reference signal, indicating means including a screen and means for producing a spot of light on said screen, means responsive to one of said unidirectional voltages for deflecting said spot in one direction, means responsive to the other of said unidirectional voltages for deflecting said spot in a transverse direction, and control device actuating means responsive to one of said unidirectional voltages.

4. In testing apparatus, a source of alternating current, a test coil coupled to said source and arranged to be loaded by structure under test, a phase splitter circuit coupled to said source and arranged to produce first and second reference signals approximately 90 degrees out of of phase relative to each other, a first detector circuit responsive to said first reference signal and a test signal derived from said coil for developing a first unidirectional voltage proportional to the component of said test signal in phase with said first reference signal, a second detector circuit responsive to said second reference signal and said test signal for developing a second unidirectional voltage proportional to the component of said test signal in phase with said second reference signal, indicating means including a screen and means for producing a spot of light on said screen, means responsive to one of said unidirectional voltages for deflecting said spot in one direction, means responsive to the other of said unidirectional voltages for deflecting said spot in a transverse direction, control device actuating means responsive to one of said unidirectional voltages, and an adjustable phase shifter arranged for coupling said phase-splitter circuit to said source.

References Cited in the file of this patent

UNITED STATES PATENTS

| | | |
|---|---|---|
| 2,010,189 | Hallowell | Aug. 6, 1935 |
| 2,102,451 | Zuschlag | Dec. 14, 1937 |
| 2,162,009 | Goldsmith | June 13, 1939 |
| 2,222,221 | Burford | Nov. 19, 1940 |
| 2,290,330 | Irwin | July 12, 1942 |
| 2,372,056 | Broding | Mar. 20, 1945 |
| 2,440,984 | Summers | May 4, 1948 |
| 2,455,792 | Meunier | Dec. 7, 1948 |
| 2,489,920 | Michel | Nov. 29, 1949 |
| 2,572,908 | Brenholdt | Oct. 30, 1951 |
| 2,587,631 | Kuehne | Mar. 4, 1952 |
| 2,594,947 | Lynch | Apr. 29, 1952 |
| 2,610,230 | Wiegand | Sept. 9, 1952 |
| 2,700,132 | Kuehne | Jan. 18, 1955 |